United States Patent
Ball

(10) Patent No.: US 8,600,736 B2
(45) Date of Patent: Dec. 3, 2013

(54) LINGUISTIC ANALYSIS

(75) Inventor: John Ball, Duffys Forest (AU)

(73) Assignee: Thinking Solutions Pty Ltd, Terrey Hills, NSW (AU)

( * ) Notice: Subject to any disclaimer, the term of this patent is extended or adjusted under 35 U.S.C. 154(b) by 1019 days.

(21) Appl. No.: 12/521,190

(22) PCT Filed: Dec. 21, 2007

(86) PCT No.: PCT/AU2007/002005
§ 371 (c)(1),
(2), (4) Date: Jun. 25, 2009

(87) PCT Pub. No.: WO2008/080190
PCT Pub. Date: Jul. 10, 2008

(65) Prior Publication Data
US 2010/0030553 A1    Feb. 4, 2010

(30) Foreign Application Priority Data
Jan. 4, 2007    (AU) ................................ 2007900017

(51) Int. Cl.
*G06F 17/27*    (2006.01)

(52) U.S. Cl.
USPC ............ 704/9; 704/8; 704/7; 704/4; 704/235; 704/2; 704/1; 704/10; 704/270.1; 704/275; 715/202; 715/236; 715/243; 707/999.107; 455/154.2; 434/157

(58) Field of Classification Search
USPC ........ 704/2, 4, 8, 74, 235, 21, 10, 270.1, 275; 715/202, 236, 243; 707/999.107; 455/154.2; 434/157
See application file for complete search history.

(56) References Cited

U.S. PATENT DOCUMENTS

| | | | | |
|---|---|---|---|---|
| 4,641,264 A * | 2/1987 | Nitta et al. | ........................ | 704/4 |
| 5,477,450 A * | 12/1995 | Takeda et al. | ..................... | 704/2 |
| 5,644,774 A * | 7/1997 | Fukumochi et al. | ............. | 704/4 |
| 5,842,159 A * | 11/1998 | Nakamura et al. | ................ | 704/4 |
| 6,321,191 B1 * | 11/2001 | Kurahashi | .......................... | 704/8 |
| 6,385,568 B1 * | 5/2002 | Brandon et al. | ................... | 704/7 |
| 6,408,266 B1 * | 6/2002 | Oon | ................................. | 704/1 |
| 7,047,182 B2 * | 5/2006 | Masuichi | ........................... | 704/7 |
| 7,330,810 B2 * | 2/2008 | Kim et al. | ......................... | 704/4 |
| 2002/0032564 A1 * | 3/2002 | Ehsani et al. | ................. | 704/235 |

(Continued)

FOREIGN PATENT DOCUMENTS

| | | |
|---|---|---|
| EP | 1111514 B1 | 6/2001 |
| JP | 11250064 A | 9/1999 |
| WO | 98/11491 A1 | 3/1998 |

*Primary Examiner* — Michael Colucci
(74) *Attorney, Agent, or Firm* — Richard M. Goldberg

(57) ABSTRACT

A method of operating a computer to perform linguistic analysis includes the steps of splitting an input text into words and sentences; for each sentence, comparing phrases in the sentence with known phrases stored in a database, as follows: for each word in the sentence, comparing its value and values of words following it with values of words of stored phrases, starting with the longest stored phrase that starts with that word, and working from longest to shortest; in the event a match is found for two or more consecutive words, and considering the words around the phrase, labelling the matched phrase with an overphrase that describes the grammar use of the matched phrase; after the penultimate word has been compared, recasting the sentence by replacing the matched phrases by their respective overphrases; and then repeating the comparison process with the recast sentence until there is no further recasting.

22 Claims, 14 Drawing Sheets

(56) References Cited

U.S. PATENT DOCUMENTS

| | | | |
|---|---|---|---|
| 2003/0233226 A1* | 12/2003 | Kim et al. | 704/4 |
| 2004/0030540 A1* | 2/2004 | Ovil et al. | 704/1 |
| 2004/0088327 A1* | 5/2004 | Shimomura et al. | 707/104.1 |
| 2006/0025091 A1* | 2/2006 | Buford | 455/154.2 |
| 2006/0190804 A1* | 8/2006 | Yang | 715/500 |
| 2007/0112553 A1* | 5/2007 | Jacobson | 704/2 |
| 2007/0112554 A1* | 5/2007 | Goradia | 704/4 |

* cited by examiner

Text: John is a *jack of all trades.*

LINGUISTIC ANALYSIS

TECHNICAL FIELD

The invention concerns linguistic analysis. In particular the invention involves a method of operating a computer to perform linguistic analysis. In another aspect the invention is a computer system which implements the method, and in a further aspect the invention is software for programming a computer to perform the method.

BACKGROUND ART

Today, somewhere between 6,500 and 10,000 languages are spoken worldwide. Since computers were first constructed, attempts have been made to program them to understand human languages and provide translations between them. Many computer methods have been proposed to understand and translate languages. These methods generally rely on the use of sets of language-specific rules created to utilise tagged words or statistical methods based on word sequence likelihood computed from the analysis of language samples. For rule-based systems, the programmer normally writes the code specifically to interpret the rules—a lengthy and complex task. Furthermore, these approaches do not usually cater effectively to the use of idiomatic words and phrases.

SUMMARY OF THE INVENTION

The invention is a method of operating a computer to perform linguistic analysis, comprising the steps of:
  splitting an input text into words and sentences;
  for each sentence, comparing phrases in the sentence with known phrases stored in a database, as follows:
  for each word in the sentence, comparing its value and the values of the words following it with the values of the words of stored phrases, starting with the longest stored phrase that starts with that word, and working from longest to shortest;
  in the event a match is found between the value of two or more consecutive words and the value of a stored phrase, labelling the matched two or more consecutive words with an overphrase that describes the matched value;
  after the penultimate word has been compared, recasting the sentence by replacing the matched parts by their respective overphrases; and
  then repeating the comparison process with the recast sentence until there is no further recasting.

The value used in the comparison process may involve the literal spelling of the words, the sense-meaning of the words, the grammatical use of the words or other attributes of the words. The invention is satisfied by use of any one of these values, or by adding a second or third tier of comparisons involving one or more of the other values. By matching word sequences this way, both grammatical and semantic content can be addressed at the same time.

The comparison process may comprise more than the comparison of the values of words, for instance it might include conditional requirements dependent on words around the phrase. For example the outcome of the comparison may be affected by a word preceding the phrase being negative, or an adjective.

The comparison process may be performed according to a predetermined order. Similarly, phrases and words in the input text may be converted to their overphrases according to a predetermined conversion order associated with the phrases and words. This order could run forwards, matching phrases from the beginning of the sentence; or backwards by matching a sentence first and the clauses and phrases subsequently.

This invention performs linguistic analysis by emulating the mental processes used by humans when reading text. It uses a combination of hierarchical pattern storage, sequenced parsing layers and bidirectional pattern matching to convert text-based human languages into their constituent grammatical parts. These techniques mimic functions seen primarily in biological brains. The invention converts text to its hierarchical patterns, either by matching words to phrases, then phrases to clauses, then clauses to sentences or in reverse, by matching a sentence to clauses, and then clauses to phrases. The conversion is designed to ensure that the longest patterns are matched ahead of shorter ones, while maintaining the flexibility for shorter phrases to be matched first when needed. This also caters to matching idiomatic phrases and names ahead of grammatically-based phrases.

The comparison process may further comprise an error correction step that corrects a misspelled word in the input sentence when a spelling error is encountered and repeats the comparison process with the corrected word.

This invention may comprise a setup phase where words and their relationship with literal phrases, grammatical phrases and other attributes are stored in a database accessible by the invention. New words and phrases may be learned by the invention once it is in operation by adding these patterns to the database.

In linguistic analysis, word sense disambiguation is the problem of determining in which sense a word having a number of distinct senses is used in a given sentence. In other words, sometimes a phrase determines meaning independently to the words and even the letters comprising the words. This invention caters for word sense disambiguation by loading all word senses for each word at the start and then deselecting those senses that are not valid in the text provided. This leaves word senses that are consistent in all cases with the text considering the neighbouring word's stored attribute patterns. Like the puzzle in which 9 dots in a square are connected continuously with 4 straight lines by drawing outside the box, word-sense disambiguation is effected by the word's senses matching between themselves and neighbouring word's sense patterns.

This invention may further cater for word sense disambiguation via language generation. The invention may operate on its output (senses, phrases, grammar uses and attributes) to determine a consistent alternative for a word or phrase using the grammar uses and attributes of the word or phrase. The equivalent phrases and words may be in the same or a different language. Words and phrases may be linked with their equivalent word-sense meanings in other languages during the setup phase.

To generate a text from the grammar uses and attributes of its words and phrases, the invention may further comprise the steps of:
  for each overphrase in the input text, starting from the last overphrase determined, performing language generation to find an equivalent for the phrase or words represented by the overphrase, as follows:
  obtaining all equivalent phrases of the overphrase from the database;
  if equivalent phrases are found in the targeted language, determining a word or phrase with equivalent attributes for the overphrase;
  after the last overphrase has been considered, recasting the sentence by replacing the overphrases by their respective equivalents, which may be overphrases at a lower level; and then repeating the generation process until all overphrases are matched to words or their equivalents in the targeted language.

This invention may be implemented using an object-oriented (OO) programming language such that the relationships between a word and its grammar use words, that is words describing the grammatical usage of the word; phrases; and attributes are encapsulated by links within the word object.

This invention may be implemented in computer-based devices such as servers, personal computers, laptops, mobile phones and personal digital assistants (PDAs).

This invention is able to perform linguistic analysis on text written in various languages. It requires no distinction between the meaning of language symbols (letters, digits, punctuation), words, phrases and clauses. Advantageously, this invention can distinguish accurately between the uses of idiom, metaphor, proverbs, literal and titles; and between different senses of words.

This invention also treats different levels of language equally. Although the grammatical patterns determining meaning may differ, the principles used to achieve the goal of matching into phrases, clauses and sentences remains unchanged. Morphemes, which are words or word elements that cannot be divided into smaller meaningful parts, in one language can contain information stored in separate words in another. Words omitted in some languages are implied during the translation process by being included in the phrase pattern.

In addition, this invention has been devised to utilise existing computer technology in a new way. Today, most computer programs are written such that the program controls the operational flow and tend to use words as the principle source of meaning with word proximity used to help determine word sense disambiguation. In this invention, the data in the system controls the operation while the program's role is primarily to facilitate the data flow and to interface with Input or Output (I/O) functions like screen display and external interface formatting.

In another aspect the invention is a computer system which implements the method. In a further aspect the invention is software for programming a computer to perform the method.

BRIEF DESCRIPTION OF THE DRAWINGS

An example of the invention will now be described with reference to the accompanying drawings, in which.

BEST MODES OF THE INVENTION

The invention 100 will now be explained with reference to FIG. 1. First, an input text of length $L_1$ is examined to identify a series of words, determining word boundaries with support from spaces or punctuation, in step 110. The input text may be a collection of letters, numbers, punctuation marks or other linguistic symbols.

The series of words, for example up to an "end-of-file" character, form the first input sentence (step 120) that is provided for Text Parsing 130 in a first parse round. In general we denote the input sentence for Text Parsing 130 in parse round j as:

$$Wj(1)Wj(2)\ldots Wj(L_j),$$

where Wj(1) represents the first word of the sentence and $L_j$ is the length of the input sentence in the current round.

Figure 2:
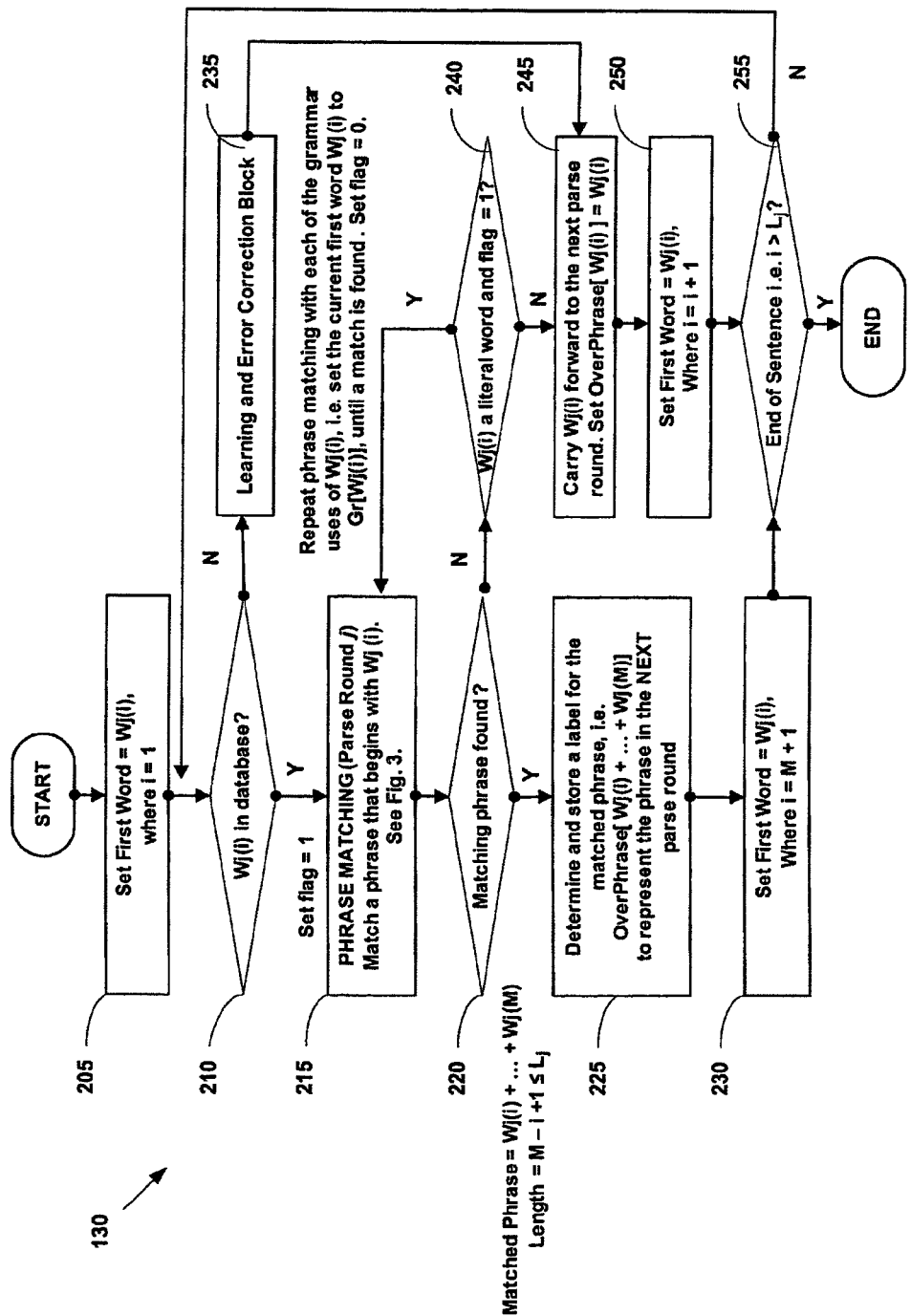
FIG. 2 shows the sequence of steps performed by the invention in a parse round j.

The function of Text Parsing 130 is to identify phrases in the input sentence. Specifically, it matches unknown phrases in the input sentence with known phrases in a database. In the event a match is found for two or more consecutive words, the matched phrase is labelled with an Overphrase that describes the grammar use of the matched phrase. The matching process performed by Text Parsing 130 is repeated until no new phrases are identified. Each round of Text Parsing 130 is known as a parse round, denoted as j, and the sequence of steps performed in round j is shown in FIG. 2.

Given an input sentence of $Wj(1) Wj(2) \ldots Wj(L_j)$, Text Parsing 130 first determines the position of the first unknown word in the input sentence in step 205. For example, in the first iteration, the first unknown word is, Wj(i), where i=1. Unknown word Wj(i) is then matched with a known word in the database in step 210 via a lookup facility, such as a hash table. The unknown word may be a literal word such as "cat"; or a phrase word such as "[Noun: cat]". The latter may occur in the sentence only after the first parse round.

If the current unknown word Wj(i) is not found in the database in step 210, Text Parsing 130 carries the unknown word forward as its Overphrase in step 245; and determines the next unknown word in the sentence in step 250. In this case, unknown word counter i will be increased by one. If there are still more unmatched words in the sentence (step 255), the lookup procedure in step 210 will be repeated with the next unknown word. Block 235 performs learning and error correction and may not store a new word because the word might be misspelled or incorrectly used. If a spelling error is determined, step 215 follows with the corrected word.

Figure 4A:
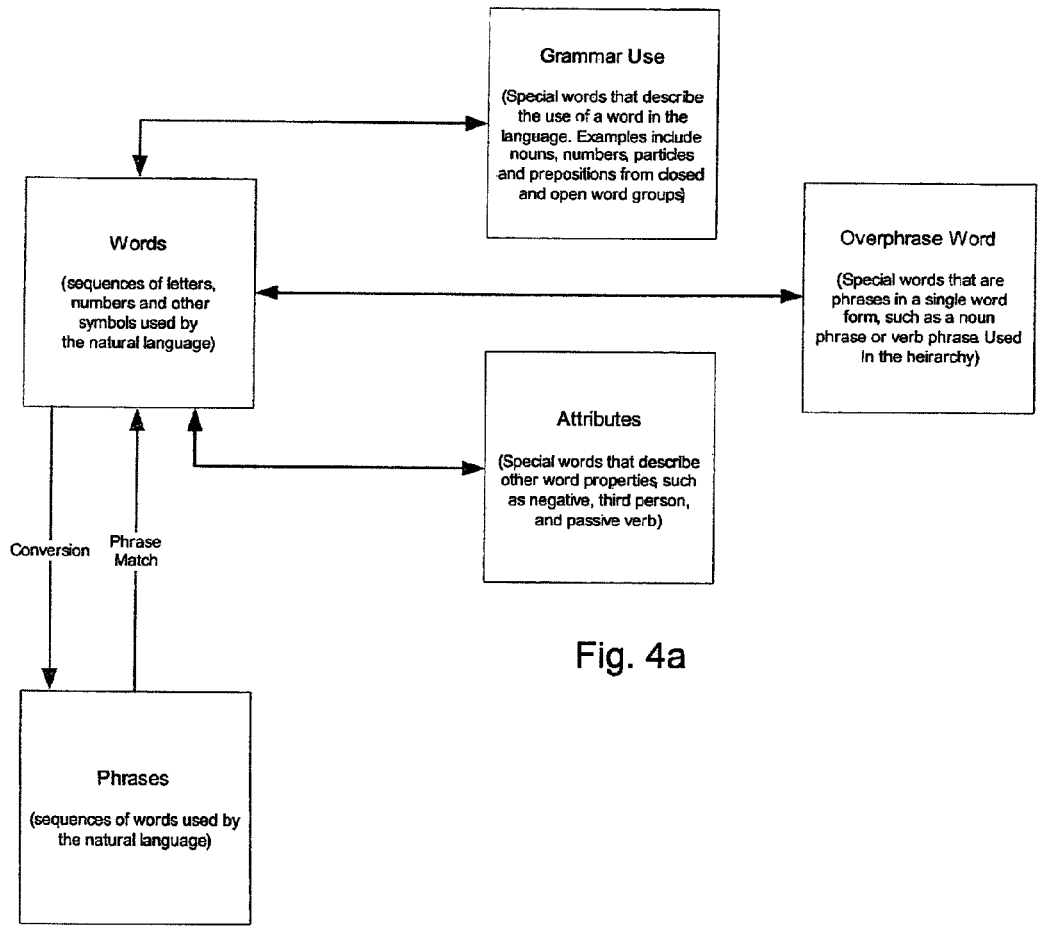
FIG. 4A shows the relationships among words and phrases in the invention.

On the contrary, if unknown word Wj(i) is found in the database in step 210, phrase matching procedure 215 is performed to find a known phrase in the database that matches with a phrase in the input sentence starting with Wj(i). Each known word in the database has an associated set of grammar uses, attributes, senses and phrases that are linked directly to this word via mechanisms such as software-based array lists. Phrases, clauses and sentences are likewise initialised with a set of associations. The relationships of words and phrases in the database are illustrated in FIG. 4(a). The initial set of words, phrases and other relationship data necessary to make the system operational may be loaded into the database during a setup phase and once the invention is in operation, new words may be learned by storing them and then linking them appropriately with the environment.

For example, literal word "the" may be linked to:
a list of phrases beginning with "the", such as "the black sleeping cat" and "The Sound of Music";
a list of grammar use words that describe the grammatical usage of "the" such as "[article]" and "[determiner]"; and
a list of other attributes.

Attributes describe other word properties such as negative, third person and verb properties such as being intransitive, conditional and passive. Similarly, the grammar use word "[article]" may be linked to a list of phrases such as "[article] [noun]" and "[article] [adjective] [noun]" to describe the possible valid phrase elements starting with "[article]".

The sequence of steps performed by phrase matching procedure 215 will be explained with reference to FIG. 3. Given an input sentence of $Wj(i)\ Wj(i+1)\ldots Wj(L_j)$, a list of known phrases that begin with the first word $Wj(i)$ is obtained from the database in step 300. If one or more phrases are found 220, the phrases obtained are recalled according to their length, from the longest to the shortest, in step 310 to ensure that the longest matching phrase is found first.

Assume that K phrases are found and the sorted phrases are denoted as:

$P1(1)P1(2)\ldots P1(N_1)$      Phrase 1

$Pk(1)Pk(2)\ldots Pk(N_k)$      Phrase k $PK(1)PK(2)\ldots PK(N_K)$,      Phrase K where $N_k$ is the length of phrase k and k=1...K. Only phrases with length less than or equal to the length of the input sentence, that is $L_j-i+1$, need to be considered. Since the list is ordered, it is obvious that $N_1 \geq N_2 \geq \ldots \geq N_K$. Note that all phrases begin with the same word, that is $Pk(1)=Wj(i)$ for all k.

The phrase matching procedure 215 then matches each of the known phrases in the list with the input sentence $Wj(O$ $Wj(H-I)\ldots Wj(L_j)$. Specifically, in steps 320 to 340, the mth word of Phrase k, $Pk(m)$, is paired and compared with the corresponding word in the input sentence, $Wj(m+z-1)$, for $m=2\ldots N_k$. If both $Pk(m)$ and $Wj(m+z-1)$ are literal or grammar use words, a direct comparison can be made. If words are not matched in step 340, the process continues to step 350 where it is determined if this is the last phrase. If yes, it determined that a match is not found and the process ends. If no, the process returns to step 320. If words are matched in step 340, it is determined if this is the last in step 360. If yes, it continues to step 370. If no, it returns to step 320.

However, if $Pk(m)$ is a grammar use word but $Wj(m+i-1)$ is a literal word, a direct comparison cannot be made. The grammar use words linked to $Wj(m+i-1)$ will be used to make the comparison. For example, if the active parser phrase is "[article] man" and a known phrase:

"[article] [noun]"

is found linked to the grammar use word "[article]", the grammar use words associated with the second word "man" will be compared with "[noun]". We denote the grammar use word of a word $Wj(i)$ as $Gr[Wj(i)]$.

Figure 3:
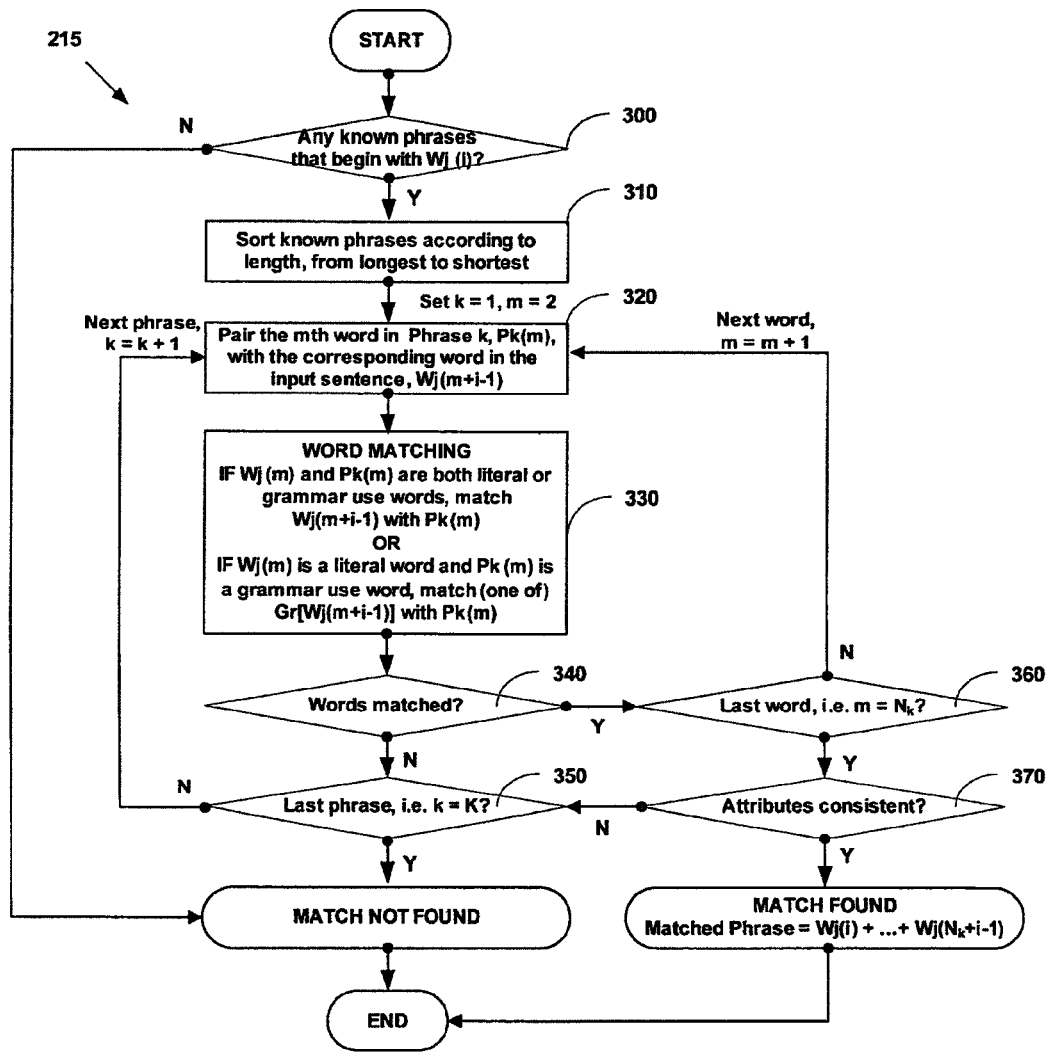
FIG. 3 shows the sequence of steps performed by the phrase matching procedure of the invention in a parse round j.

The process of word matching in step 330 in FIG. 3 will be repeated with other pairs of words in the phrase and input sentence until either a non-matching pair is discovered or all pairs of words have been matched. In the former, steps 320 and 330 will be repeated with the next phrase in the list. However, if all phrases have been compared with the input sentence, the outcome of the phrase matching procedure 215 is that no matching phrase is found 220.

If all word pairs have been matched, that is when a matching phrase is found, the attributes, or word senses, or both, of the stored phrase in the database will be verified against the matching words in the input sentence for consistency in step 370. If the attributes, or word senses, or both are found to be consistent, the outcome of the phrase matching procedure 215 is the matching phrase. Otherwise, the pattern is not matched and steps 320 and 330 will be repeated with the next phrase in the list. Similarly, if all phrases have been compared with the input sentence, the outcome of the phrase matching procedure 215 is that no matching phrase is found 220.

Outcome 1—A Matching Phrase is Found

Figure 4B:
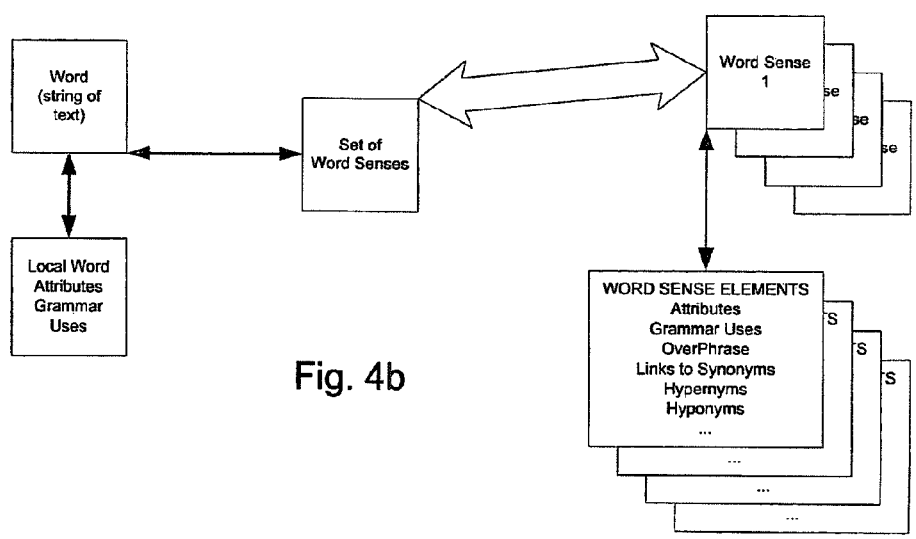
FIG. 4B shows the relationships between a string of words, attributes, word senses and word sense elements.

When a matching phrase is found, the longest phrase matched is selected. Where there is a tie, the most complex pattern in terms of the number of elements is selected. Every time phrase matching procedure 215 successfully matches a phrase in the input sentence with a known phrase in the database, an Overphrase will be assigned to the phrase in step 225 of FIG. 2 to represent the phrase in the next parse round. Before assigning an Overphrase, the word senses of the matched phrase are first checked for consistency. From the remaining consistent word senses, see FIG. 4B, an Overphrase is selected that summarises the meaning and grammatical properties of the matched phrase and represents the phrase in the next parse round.

For example, consider the following matched phrase:

$Wj(i)Wj(i+1)\ldots Wj(M)$, where M is the length of the matched phrase and M is less than or equal to the length of the input sentence in the current parse round j. An Overphrase of the matched phrase, $Over[Wj(i)Wj(i+1)\ldots Wj(M)]$, will be determined and stored. The Overphrase may be determined based on the phrase's properties. By default, each phrase has a linked Overphrase that may be used without change. In addition, words in the matched phrase may be analysed to find a more suitable, specific Overphrase.

After step 225, the unknown word counter i will be increased to M+1, that is the word that follows the matched phrase. Step 210 will be repeated if there are more unknown words in the sentence. In other words, once a matching phrase is found, the parsing procedure skips over the matched, or now known, words to match the next sequence of unknown words in the sentence.

Outcome 2—A Matching Phrase is not Found

If the phrase matching procedure 215 does not find any matching phrase that begins with the current unknown word $Wj(i)$ in the database, Text Parsing 130 will perform one of the following steps:

If $Wj(i)$ is a literal word 240, obtaining a list of known grammar use words, $Gr[Wj(i)]$, associated with $Wj(i)$ and repeating the phrase matching procedure 215 with each of the grammar use words as the first word of the input sentence until a match is found or all grammar use words for the literal word have been considered; Or If $Wj(i)$ is not a literal word, setting $Wj(i)$ as its Overphrase in 245 of FIG. 2; and repeating step 210 with $Wj(i)$ skipped over to find the next unknown phrase in the sentence starting with $Wj(i+1)$ if there are more unmatched words in the sentence.

The purpose of repeating the phrase matching procedure with each of the grammar uses of $Wj(i)$ is to find a known grammatical phrase in the database that matches with the grammar uses of $Wj(i)$ and its subsequent words. For example, the input sentence "the old man" may not be found in the database but can be matched to "[article] [adjective] [noun]". The output of the Text Parsing is a sentence of Overphrases representing their respective phrases.

Text Parsing 130 stops when all words in the input sentence have been considered. The output of each parse round j of Text Parsing 130 is a sentence of Overphrases that represent the matched phrases in the input sentence and any words carried forward because they are unmatched in the current round. In other words, the Overphrase for an unmatched word is the word itself. Therefore, the length of the input sentence in each parse round j, that is $L_j$, might be different.

Figure 1:
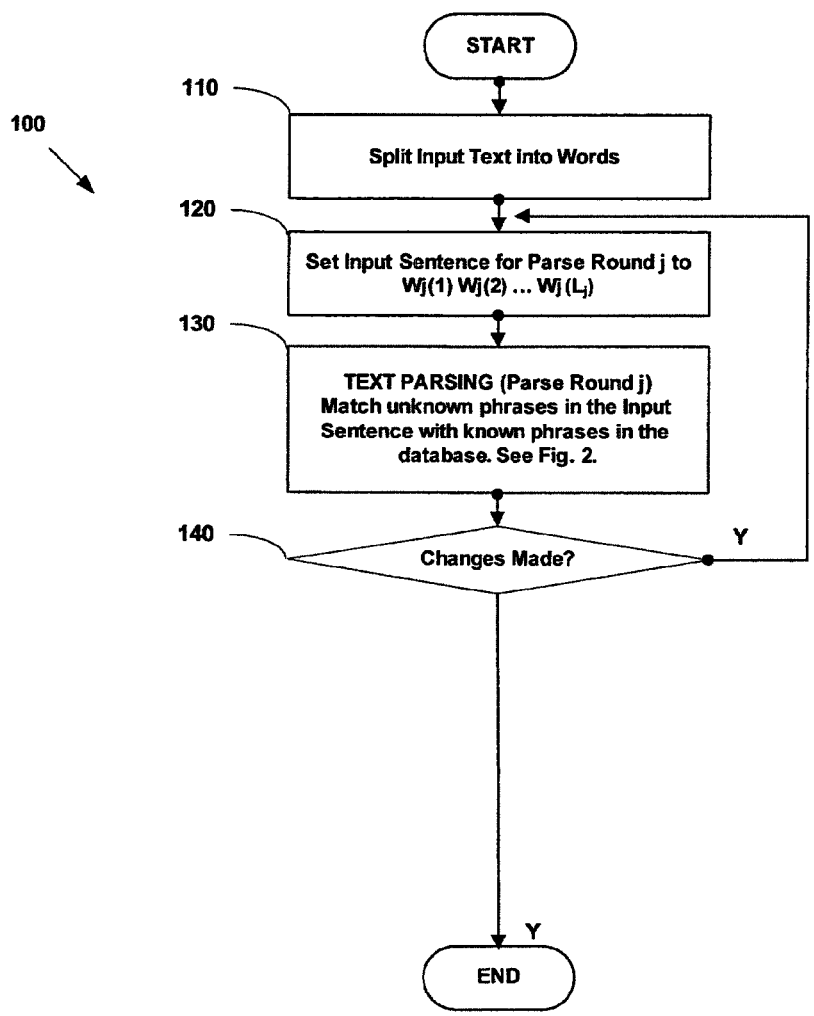
FIG. 1 is a flowchart of the invention.

Following Text Parsing 130 in FIG. 1, the output of the Text Parsing 130 is compared with the input sentence, in step 140. If the sentences are different, the output sentence of the current parse round will be used as the input sentence for the next parse round. The comparison process is repeated until no progress is made or, more specifically, when the output sentence is the same as the input.

Parsing all possible phrases ensures that the Text Parsing 130 finds the longest matching phrase that begins with the word including idiomatic phrases. In order to correctly converge phrases in light of the ambiguity found in all languages, the design of the stored phrases predetermines the order in which phrases are matched and the order in which words are converted to their Overphrases.

Figure 4C:
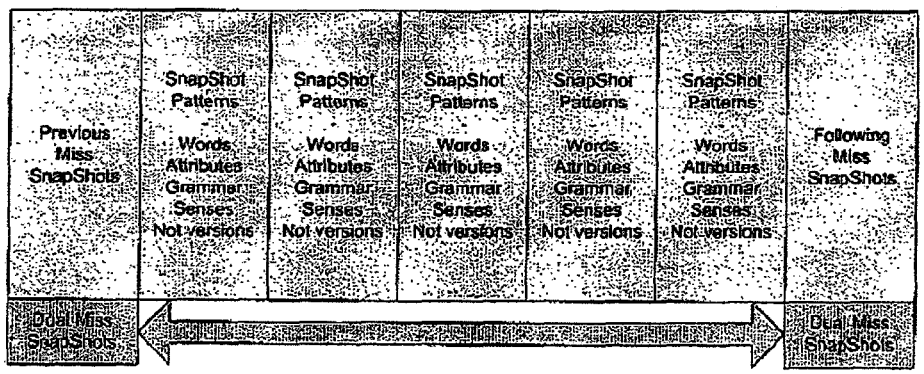
FIG. 4C shows the detail of a phrase's pattern structure.
Figure 4C:
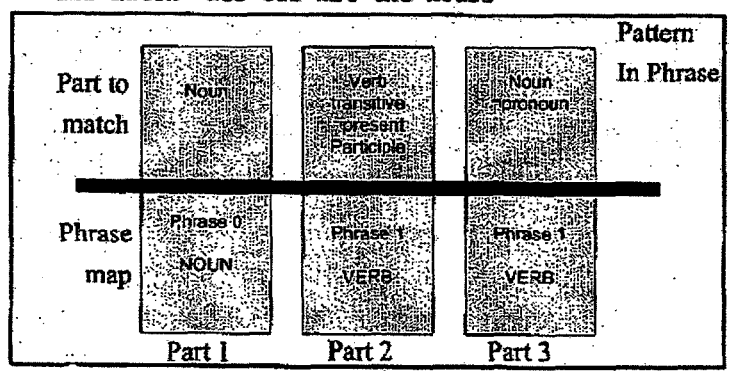

Clause and sentence matching can be explained further with more detailed reference to FIG. 4C. In the lower part of the figure, a subject-verb-object (SVO) clause is defined as a noun, followed by a verb which must be transitive but not a present participle, and then followed by a noun which isn't a pronoun. By matching an input text with this specific pattern will result in the invention providing the SVO Overphrase for further parse rounds.

To identify the word uses in the matched SVO phrase requires additional analysis, facilitated with the use of the phrase's optional phrase map. A phrase map identifies the otherwise ambiguous elements of the matched SVO phrase. In this example, the first noun is numbered phrase 0 and is a noun. The second phrase is numbered phrase 1 and is a verb plus its direct object (part of the verb).

Phrase 0 is a noun, so other grammar word senses can immediately be excluded and hence reducing the word's ambiguity. Among the remaining overphrase options, a selection is made from within the noun senses. Further sense disambiguation is possible at the clause level.

Phrase 1 comprising two words is matched by (a) either searching again for that pattern, in this case in isolation from the text to remove the normal phrase checking which considers previous and subsequent inhibitory words because the phrase itself has been identified, or alternatively by (b) accessing an embedded phrase describing phrase 1 in detail. Although not shown in the diagram, phrase 1 would comprise a phrase with 2 elements, a verb and a noun. The noun would identify the grammatical direct object or alternatively a thematic relationship.

Example 4 illustrates the use of different levels of phrases to determine a match leading to a valid sentence match. There is no value in a pattern matching system that converges incorrectly on phrases within a sentence, as the sentence cannot be understood. A strategy of converging noun phrases first, followed by verb phrases can be effective, with clause and sentence matching working in reverse order to address some types of ambiguity. To enforce the sequential conversion of words to phrases and clauses is enabled through 4 additional patterns stored within the phrase itself (refer FIG. 4C top).

Each phrase incorporates a Miss snapshot pattern. As its name suggests, when this pattern is matched in the words after the phrase, the phrase is missed, not matched as in 'the boy and' will not match the phrase 'the boy' while the 'and' remains. A second phrase match-limiter is the Previous Miss snapshot pattern. This pattern is matched if the preceding words to this phrase are matched resulting in the overall phrase not matching even if its elements do match as in 'red and white boys' will not match 'white boys' as a noun phrase while the preceding word 'and' remains. A third limiting tool within a phrase match are the Dual Miss snapshots. These are simply designated pairs of Previous Miss and Miss Snapshots which must both be matched to fail the phrase match. This stops a noun phrase 'the wrist watches' being identified if it is the only sentence element and enables an SV clause to match instead. The final of the four phrase limiting controls is the All Miss setting. This phrase will never match a pattern within the text, as it checks to see if there is any previous character, such as the start of line character. This enables phrases with this setting active to only match patterns when they are a subphrase to another pattern being matched top-down. The ambiguous nature of language appears controlled with these four additional controls and the top-down approach.

The top down approach supplements the individual phrase patterns controls described above. In the top down approach, a clause or sentence is matched first, and then its phrases identified as a result of boundaries identified by the higher pattern. As the invention allows any number of similar phrase patterns to be stored, grammatically and semantically similar patterns can be stored and effective disambiguation effected upon analysis of the input text.

Referring to Example 4a and 4b are further examples of the types of elements necessary to match a clause in one step (4a) using the top-down approach and in two steps using the bottom-up approach, matching phrases first (4b).

Each example illustrates how a clause is matched using a few stored phrases and stored words with their respective word-senses which in this case contains just a label. 4a shows two stored phrases and includes a phrase map which matches the input text immediately. The subject becomes the Overphrase, np:canis and through an embedded phrase match, the predicate comprising a verb vp:eat4 and direct object np:food1 are identified. This takes place in parse round 1 as shown in the example and of course the Overphrases could be any matching word-sense.

4b shows the use of three stored phrases, including a clause phrase. In this example, the first parse round results in the Overphrases np:man3 becoming the first word in the second round as shown. Of interest is that the second round matches the SVO pattern, which in this case is the same pattern that matched the clause in example 4a. In this case, however, the application of the phrase map need not replace the word-senses with further Overphrases, as they are already there. Following clause match, further word-sense disambiguation will reduce the number of valid word-senses from the selection linked to the initial words.

Phrase Pattern Inhibition

Matching a phrase involves its stored pattern being matched as described. To ensure lower level patterns are not incorrectly matched before higher-level patterns, control is required in the form of phrase inhibition. Phrase inhibition defines additional pattern matching validations. In practice, inhibition results in the appearance of phrases determining the validity of the match themselves.

Figure 4D:
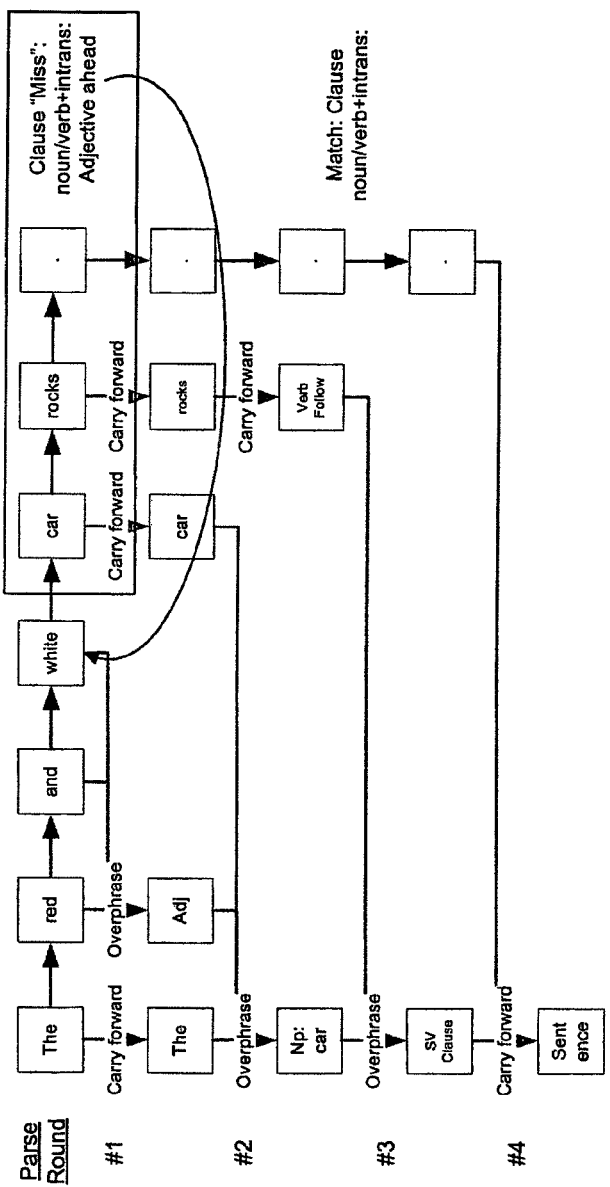
FIG. 4D shows an example where a phrase pattern inhibits a match in one case, then allows it.

Some of the necessary phrase inhibitions include missing matches when (a) a defined pattern follows a phrase, such as the word 'and' following the phrase 'the cat' in 'the cat and dog are sleeping'; (b) a defined pattern preceding a phrase, like the adjective 'red' in the phrase 'the white and red dogs eat' inhibiting the matched clause 'dogs eat' the first time through while the phrase 'white and red' is being matched, see also FIG. 4D where the word clause "car rocks," is missed during the first pass because a leading adjective "white" was found; (c) the phrase when it is not identified from within another phrase; and (d) when both a precondition and postcondition are met, stopping the sentence 'People are.' being a noun phrase using the obscure noun 'are'.

Other necessary inhibitions on phrase matching ensure consistency with a word's meaning. Negative attributes or senses can be added to a phrase. The phrase will not match if the element is in it when the pattern includes a negative element.

Word Sense Disambiguation

The invention caters to word sense disambiguation by connecting word-senses to words during the program initiation phase. A word-sense is an overphrase word and includes a unique label. Each word-sense comprises a set of grammar uses, attributes and links between hierarchical word-senses including hypernyms and hyponyms. Word senses are comparable to synonym sets as used in dictionaries like Princeton's WordNet. The attributes and grammar uses from a word-sense are passed to the word during phrase matching.

The disambiguation process starts when a pattern is matched, which may be performed after step 225 of FIG. 2. The word's senses are then tested for consistency with the matched pattern and all inconsistent senses are removed from the next round. For example, after a verb is matched, all noun and adjective word senses are removed. Similarly, if an intransitive form of a verb is matched, all transitive senses are removed. This results in additional matching rounds being made against smaller numbers of potential word-senses.

The invention currently utilises three patterns within each sense to further identify the applicability of the sense in the text provided. These include a Previous, Current and Next pattern. The timing for comparison of these is determined within the phrase itself and will vary, however a few examples follow to clarify the intent of the sense content. A clause will compare each sense with its actual matched pattern (Current), followed by a comparison between the subject's Next and verbs Prev. In addition, during the predicate's matching with its objects, the appropriate comparisons are made. Noun phrases remove adjective senses (Next) that do no apply to the noun (Prev). In clause matching of SVC, adjectives and nouns are compared between subject and complement. This process may be iterative depending on implementation.

The invention determines a more appropriate meaning for a word by matching the attribute of the word and its neighbouring words with stored patterns. For example, assume "water", "IBM" and "Robert" have attributes [attribute: liquid], [attribute: business] and [attribute: person] respectively. Consider the following sentences:

"the water ran down the road"; and
"Robert ran IBM".

In the former, the phrase "the water ran" matches with "[article] [attribute: liquid] [Verb: run]". In this case, step 225 of FIG. 2 may selectively replace "[Verb: run]" with "[Verb: flow]", carrying forward the other phrase elements to the next parse round. Similarly, in the latter case, the sentence matches with "[attribute: person] [Verb: run] [attribute: business]". Here "[Verb: run]" may be selectively replaced with "[Verb: operate]".

As an alternative to a word containing a specific attribute, the invention uses a word's sense and any hypernyms or hyponyms it contains to compare with the attribute sought. For example, using the word-sense for run shown above with water, the phrase can match any replacement for water that has an attribute 'fluid' which is a hypernym of liquid. Similarly water has a hypernym of liquid. The right word-sense for the stored pattern is the one in which all valid word-senses will result from matches.

The process of creating stored phrases to match word-sense can be learned by experience, provided an input text contains only valid uses of a language's words, by storing the current word's sense in the matched phrase. For example, when additional matches are made, a lower hypernym could potentially replace the previous one programmatically to expand the scope of the phrase.

Word Sense Disambiguation via Generated Language

Figure 5:
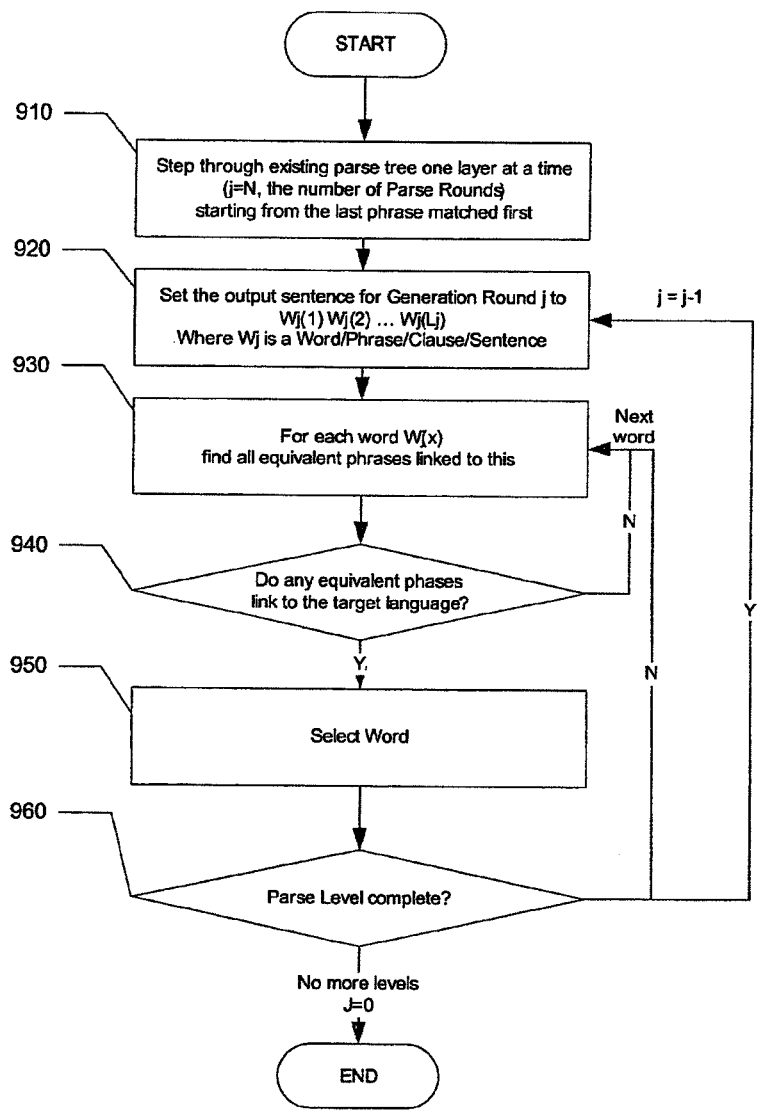
FIG. 5 shows the sequence of steps performed by the invention for language generation.

Language generation, that is generating a sentence from the output of 100, will now be described in detail with reference to FIG. 5. The invention may operate in the reverse order to generate grammatical language. Once a sentence has been parsed, a set of grammar uses and attributes are known for the sentences, clauses, phrases and words provided in the text. Similarly, the words and phrases can be linked with their equivalent meanings in other languages.

Step 910 starts the generation process by taking the highest level object, Wj(I), normally a sentence, resulting from a parse. These objects which are sentences, clauses, phrases or words become the input for the first generation round. In step 920, the output sentence is set for generation round j to Wj(1) Wj(2) ... Wj($L_j$) where Wj is a word/phrase/clause/sentence. The invention then takes Wj(I) and searches its database for all equivalents in 930. For example, an Subject-Verb-Object (SVO) clause which has a subject, verb and a direct object will typically have a number of phrases that match this clause. The best match will contain the phrases and attributes that match the parsed sentence. To translate between languages, the only additional requirement is that the generated object also matches the attribute specifying the target language. Step 940 verifies that the target language details are available to generate the target text. The word selected from the target language is the one that links with the source language words set of synonyms 950. The process repeats from step 960 until all words have been generated.

Sentences in the same language are generated by matching the current set of clauses, phrases and words in reverse. While parsing matches the physical word to identify the grammar uses and attributes, generation uses the known grammar uses, attributes and the potential uses of the word or phrase to determine a consistent alternative. For example, starting with a match of a first person verb "am watching" during the parse results in the same output during generation. However, by changing the attribute to second person, generation produces "is watching" because the best matching verb phrase linked to the verb "watch" includes the word phrase with those attributes.

Similarly, to translate to another language, such as French, each element of the Phrase must ensure its attribute is valid for French and find an appropriate equivalent phrase by seeking a valid match in the database. This approach minimises the differences between languages, addressing the different linguistic levels appropriately. Example 5 shows the full process to parse an English sentence and generate an equivalent French sentence.

Regarding word sense disambiguation for translation purposes, the selection of an appropriate foreign word relies on the known attributes, grammar uses and clause uses.

Implementation

This invention may be run on any computer-based device, including servers, personal computers, laptops, mobile phones and PDAs and be implemented most effectively using an object oriented programming language. An OO language provides the facility for words and phrases to be defined as objects that encapsulate their relevant data and connections. The phrases can be combinations of specific words, or alternatively sequences of the word's associated grammar uses or attributes.

In an OO language, the task of seeking the best matching phrase should be delegated to the word object, which is turn delegates to the stored phrases and then to its stored pattern, to each of its stored snapshot patterns and then to the specific words. During the setup phase, the invention may store phrases by directly linking them to an array list contained within the word object and ordering them according to length. The sorted list of words may be maintained to avoid the need to access the database or sort in steps 300 and 310 of FIG. 3. The invention may be supported by a dedicated hardware platform.

The size of computer virtual memory required to run the invention is a factor of the number of words and to a lesser extent the number of stored phrases, which are just sequences of links to words, and other relationships between them. There are a number of useful relationships between words facilitating the recognition of language, which can include hypernyms/hyponyms, antonyms, holonyms/meronyms and so on. Other implementations not using computer-based links are possible to further minimise the storage needed.

Example 1

Figure 6:
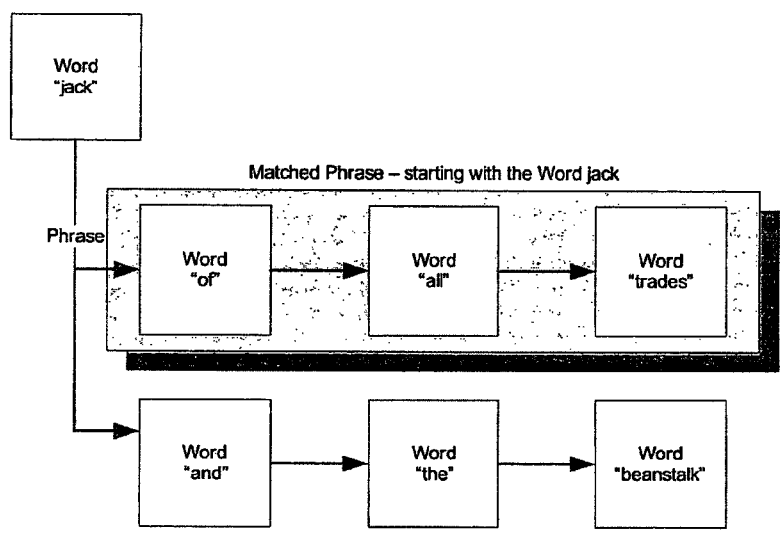
FIG. 6 shows how the invention matches an unknown literal phrase in the input sentence with a known literal phrase in the database.

An example of how an unknown literal phrase in a sentence is matched with a known literal phrase in the database is shown in FIG. 6. Assume that the input sentence to the Text Parsing 130 is "John is a jack of all trades" and during parsing the input sentence to the phrase matching procedure 215 is "jack of all trades". The procedure first sets the current unknown word to "jack" and finds a list of literal phrases that begin with "jack". In this example, there are two known literal phrases found: "jack of all trades" and "jack and the beanstalk". The procedure then repeatedly match a word in the known phrase with the corresponding word in the input sentence using steps 320 and 330 in FIG. 3 until either a pair of unmatched words is found or a matching phrase is found. In this case, the first phrase is an exact match to the input sentence.

Note that there is no single index to a known phrase in the database. The mechanism to match a phrase starts with the word found in a lookup table in step 210 of FIG. 2. Upon matching the word, the invention uses a list of stored phrases starting with this word to seek a match. By having no specific index, finding matching phrases will function successfully regardless of corruption in the input sentence both before or after the phrase. For example, "Blah blah jack of all trades blah" will still match the phrase "jack of all trades" in the database. Similarly, the speed to find potential matches is rapid because only potential matches are considered.

Example 2

Figure 7A:
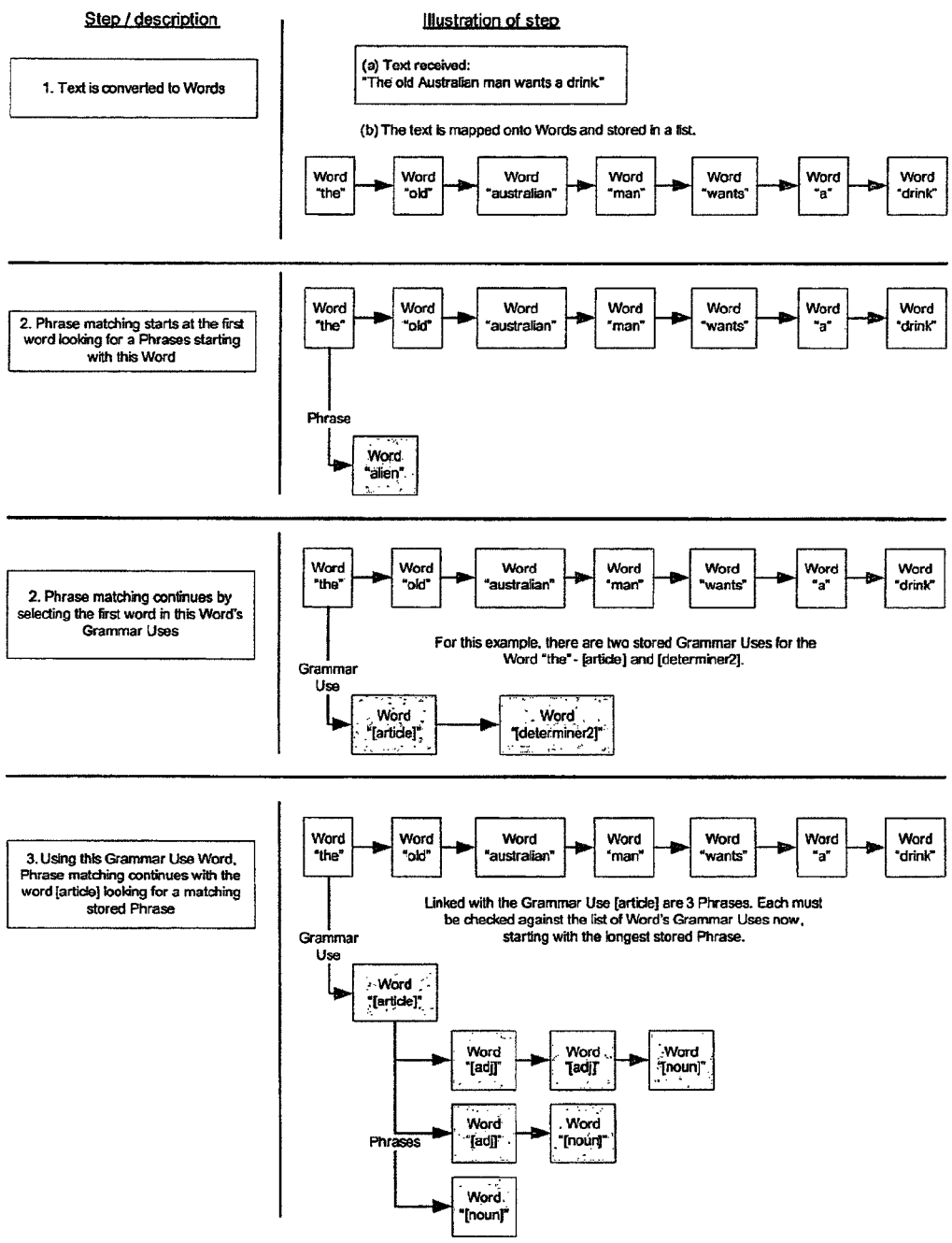
FIGS. 7A and 7B illustrate round 1 of a parsing procedure.
Figure 7B:
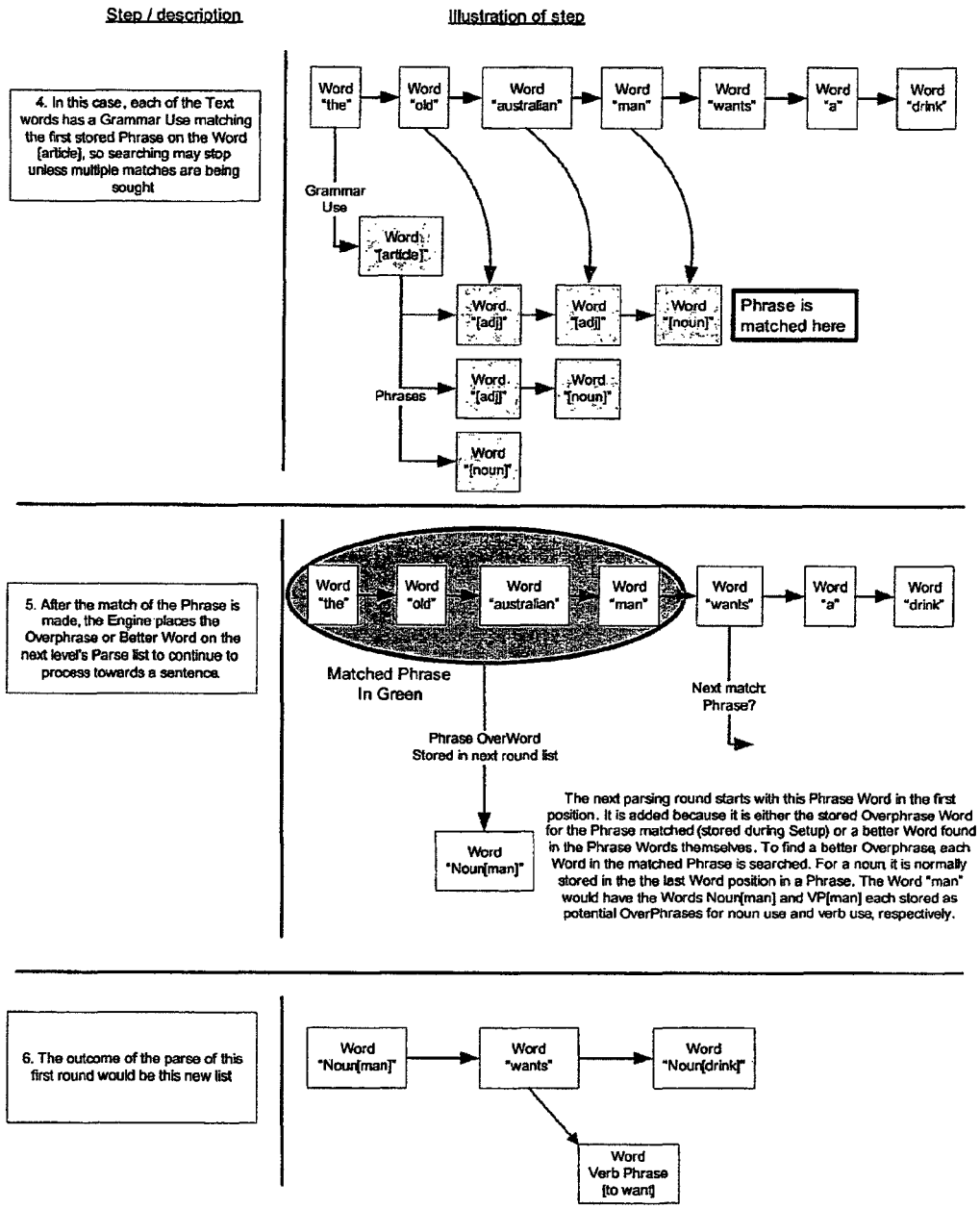

The steps performed by the invention in FIGS. 1, 2 and 3 will now be demonstrated with reference to an example in FIGS. 7A and 7B. Given an input sentence, the input text is first split into words using step 110 in FIG. 1. In the first parse round, the input sentence to the Text Parsing 130 is "The old Australian man wants a drink". Referring to FIG. 2, step 210 matches the first unknown word "The" with a known word in the database. When the word is found, a list of phrases that are linked to "The" in the database is obtained using step 300 of FIG. 3. In this example, there is only one stored phrase linked to the word "The" and phrase matching procedure 215 fails to find a matching phrase. It may be common to have few literal Phrase patterns. These phrases are typically for literal phrases such as movie titles, idiomatic phrases, clichés, and proper names.

Since "The" is a literal word, the grammar use words associated with the word is obtained from the database after step 240 in FIG. 2. For example, "[article]" and "[determiner]" are found linked to "The" in the database. Step 210 is then repeated with each of the known grammar use words replacing "The" as the first word of the input sentence to procedure 215. In the first iteration, "[article]" replaces "The" and the input sentence becomes "[article] old Australian . . . ". A list of known phrases that begin with "[article]" is then obtained and sorted in steps 300 and 310.

In this example, three matching phrases are found: "[article] [adjective] [adjective] [noun]", "[article] [adjective] [noun]" and "[article] [noun]". Consider the first phrase, "[article] [adjective] [adjective] [noun]". Starting from the second word of the known phrase, each of the words in the phrase is paired and compared with the corresponding word in the input sentence. Consider the pair, "[adjective]" and "old". Since "old" is a literal but "[adjective]" is a grammar use word, step 330 of FIG. 3 will match one of the grammar uses of "old" with "[adjective]". In this example, grammar use word "[adjective]" is associated with "old" and therefore a matching pair is found. Word matching procedure 330 is then repeated until a non-matching pair is found or the end of the phrase is reached. Note that in a natural language many words have multiple grammar uses. Words can also be linked back to their associated phrases to enable error correction in the event of text corruption.

After a matching phrase is found, an Overphrase for the matched phrase is determined and stored to represent the phrase in the next round. Next, the next unknown word in the sentence is set to "wants" in step 230 of FIG. 2. Phrase matching procedure 215 is repeated until all phrases have been matched. The outcome of the first parse round would be "Noun [man] Verb Phrase [to want] Noun[drink]". This output sentence is used as the input sentence for the next parse round similar to Example 1.

Example 3

Figure 8:
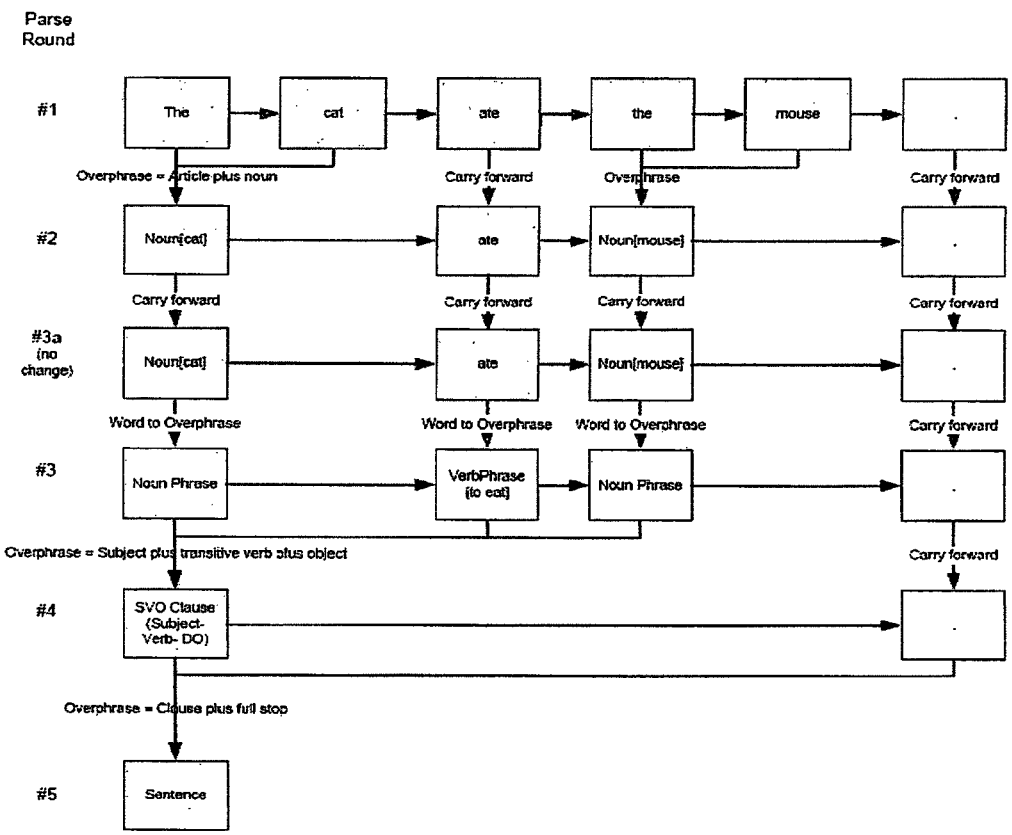
FIG. 8 shows an example of how the invention is used to parse a sentence.

An example that illustrates the outcome of Text Parsing 130 in each parse round will now be described with reference to an example in FIG. 8. The purpose is to repeatedly match known phrases in the input sentence until a final sentence is obtained. In the first parse round, the input sentence to the Text Parsing 130 is "The cat ate the mouse.". The Text Parsing 130 found four phrases "The cat", "ate", "the mouse" and "." in the input sentence. These phrases are represented by their respective Overphrases, "[Noun: cat]", "ate", "[Noun: mouse]" and "." in the second parse round (j=2). An Overphrase provides the next parse round with the grammatical use of the matched phrase and other semantically-based stored attributes, for example, a cat is [attribute: third-person], [attribute: singular] and an [attribute: animal].

When there are no changes made to the sentence in parse round 3, that is the phrases have converged, the words in the sentence will be converted to their respective Overphrase. In this example, "[Noun: cat]" is converted to "[Noun Phrase]", "ate" to "[Verb Phrase]" and "[Noun: mouse]" to "[Noun Phrase]". Step 120 is then repeated with this new sentence until no further progress is made. In parse round number four, the sentence "[Noun Phrase] [Verb Phrase] [Noun Phrase]" matches with a known grammatical phrase in the database, that is a Subject-Verb-DO clause or "[SVO Clause]". The process ends when the sentence converges.

Example 4

There are a number of ambiguity features in a natural language needing selective parsing controls to automatically determine the appropriate treatment. This invention caters to this control by allowing phrase patterns to include combinations of positive and negative grammatical (e.g. noun, verb) and semantic (e.g. human, third person, not determiner) content and, following the match of the phrase or clause, enabling the phrase matched to specify embedded stored patterns within the match. In addition, it provides for each phrase to specify miss conditions outside the phrase itself in the form of matched leading or following content.

For example, consider the following text:
"the barking dog was barking".
The phrases [Noun: dog] and [Verb: bark] require no control as their phrases are the longest found. However, consider the next example:
"the boys and girls ate and talked".
The phrases "boys and girls" and "ate and talked" need to be matched ahead of the phrases "the boys" and "girls ate". Otherwise, the resulting text,
"[Noun: boy] and [Subject/Verb: girls/ate] and talked", will not converge to an English clause.

In this case, there are two immediate ways using higher-level patterns. The first simply defines a pattern as [the noun and noun] [verb and verb] with appropriate attributes for which each Overphrase is the grammar type. That results in a match of clause type Subject Verb on the next parse phrase. The alternative is to define an SV clause pattern with the same elements, but instead of using 2 parse rounds, define a phrase map that dictates the noun phrase to be the first 4 words and the verb phrase to be the next 3. Either way results in the match of a clause.

After the parse round, the output of Text Parsing 130 is:
"[Noun: boy/girl] [Verb: ate/talked]".
The subject/verb clause is then found by matching the noun phrase followed by the (intransitive) verb phrase.

As another example, "Cats who are hungry run" parses its phrases first to [Noun:cats] [run]. The clause phrase, [Noun who Verb Adjective]+[Verb/intransitive] identifies the clause in the second parse round.

Example 4a

This example shows two examples of clause matching. In one case the matching takes place immediately and phrases come from it and in the latter case the phrases are matched first, followed by the clause identification.

In this example, consider the text: "Dogs eat food".
Stored Phrases are
1. noun-verb-noun (SVO CLAUSE)-phrase map has first word=NOUN, next 2 words=PREDICATE and
2. verb/transitive-noun (PREDICATE TRANSITIVE)
Stored Words/Senses (Sample Sense ID from Prototype/WordNet)
1. words dog/dogs→sense noun/phrase np:canis
2. words eat/eats/eating/ate/ate→sense verb/phrase vp:eat4
3. words food/food→sense noun/phrase np:food1

Match Sequence (Round 1—original text)
The match sequence is shown below:
1. Dogs eat food: match phrase 1. Overphrase is the grammar use word—SVO Clause.
2. A further match is sought on the embedded phrase (a predicate phrase) which matches phrase 2. Its overphrase is the sense vp:eat4. The phrase map shown which word sense to use—noun or verb in this case.

Example 4b

In this example, consider the text "The very tall Italian work man had been destroying the race competitors."
Stored Phrases
1. determiner-adverb/how-adjective/height-adjective/origin-noun-noun (NOUN)
2. had-been-verb/present participle (VERB)
3. noun-verb-noun (SVO CLAUSE)
Stored Words/Senses
1. words man/men→sense noun/phrase np:man3
2. words destroy/destroys/destroying/ . . . /destroyed→sense verb/phrase vp:demolish
3. words competitor/competitors→sense noun/phrase np:rival
Match Sequence (Round 1—Original Text)
1. The very tall Italian work man: match phrase 1. Overphrase is the sense np:man3
2. had been destroying: match phrase 2. Overphrase is the sense vp:demolish
3. the race competitors match phrase 1 (note phrases can be defined as dense, meaning they accept gaps in the pattern). Overphrase is the sense np:rival.
(Round 2 Recast as np:man3, vp: demolish, np:rival)
1. Phrase 3 matched. Overphrase is the grammar use word—SVO Clause.

Example 5

Figure 9A:
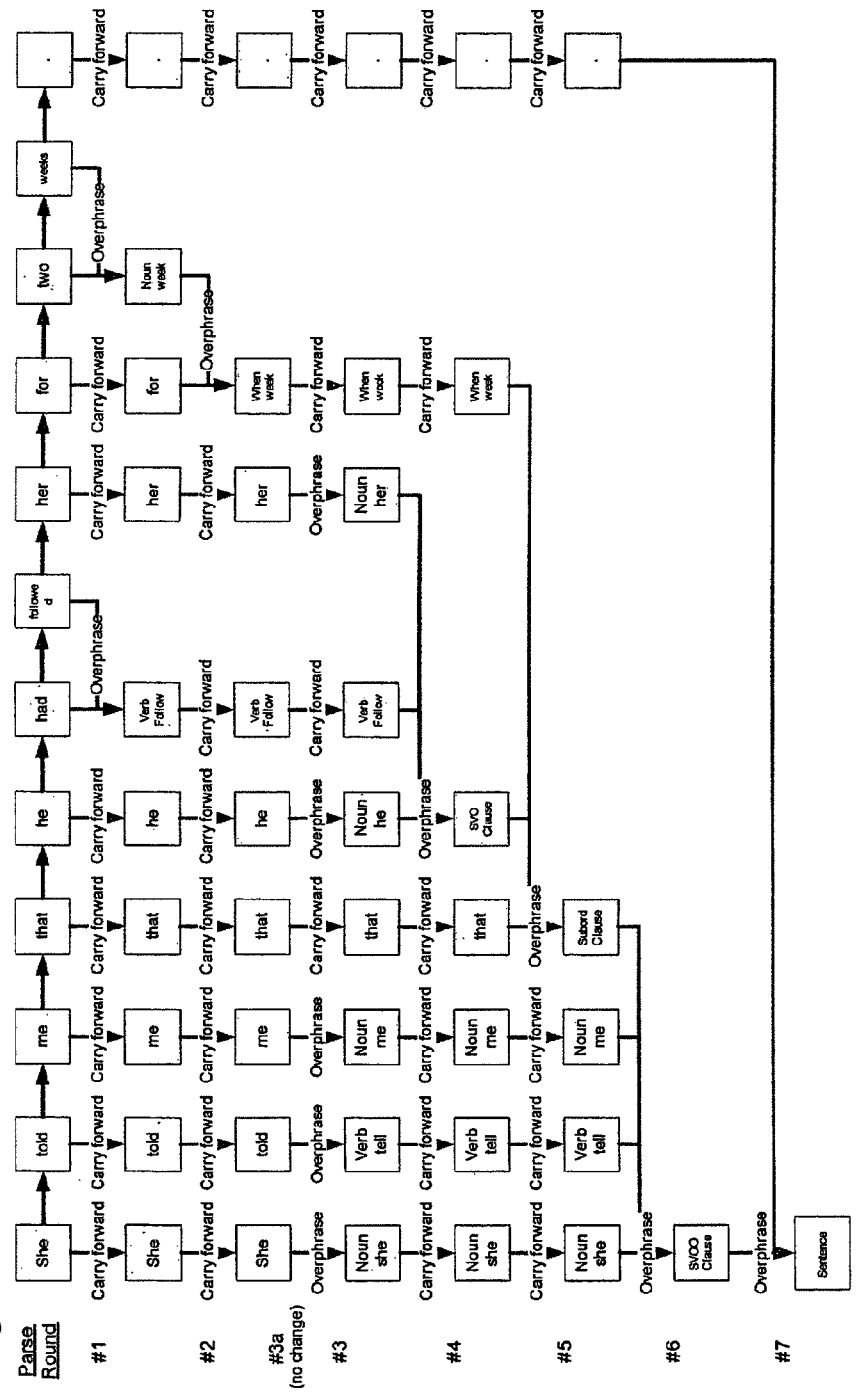
FIGS. 9A and 9B illustrate an example of the language generation feature of the invention, as detailed in FIG. 5.

Language generation will now be illustrated with reference to FIGS. 9A and 9B. FIG. 9A shows the steps to parse an English sentence with a subordinate clause. Each of the words and phrases are then available to support the generation of a foreign language sentence, which in this example is French.

Figure 9B:
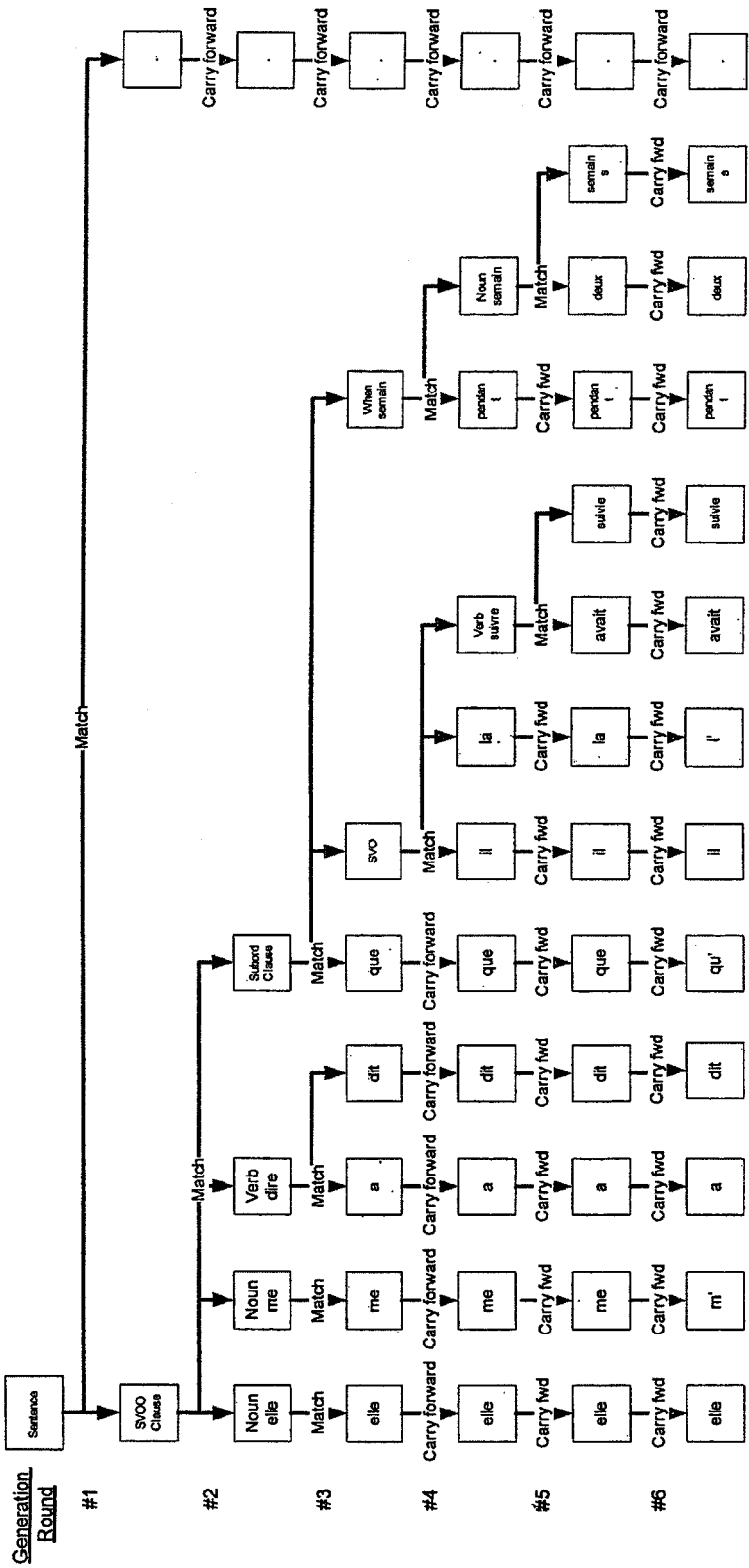

FIG. 9B shows the generation process to create the French words, starting in round 1 with the conversion of a sentence to an SVOO clause plus punctuation. In this case, the French SVOO clause matches with the sentence as seen in round 2, which uses a different word order to that of English. To expand the subordinate clause in round 3, the match found must locate the French equivalent for the word "that". In addition, the "when-phrase" relates to the duration in weeks, which needs a French equivalent. That is found by following the links from the English word—in analogy to following the phrases associated with a word. A linking stage is performed during startup to align the verb tenses between languages to approximate equivalence.

Round 3 requires the match of the French verb phrase "dire" to an appropriate tense. In this case the English simple past tense is set as equivalent to the French passé composé and along with being in third person singular form, results in the phrase match "a dit". Round 4 requires another verb generation, in this case from a French phrase "suivre" to the pluperfect, selected as equivalent to the English verb phrase "had followed" including the attributes [third person singular] and [past perfect]. The use of a feminine form for the past participle is determined by the preceding direct object "la". These generation steps are just the reverse process to the parsing process, matching the attributes to words instead of the words and grammar uses to phrases.

Figure 10:
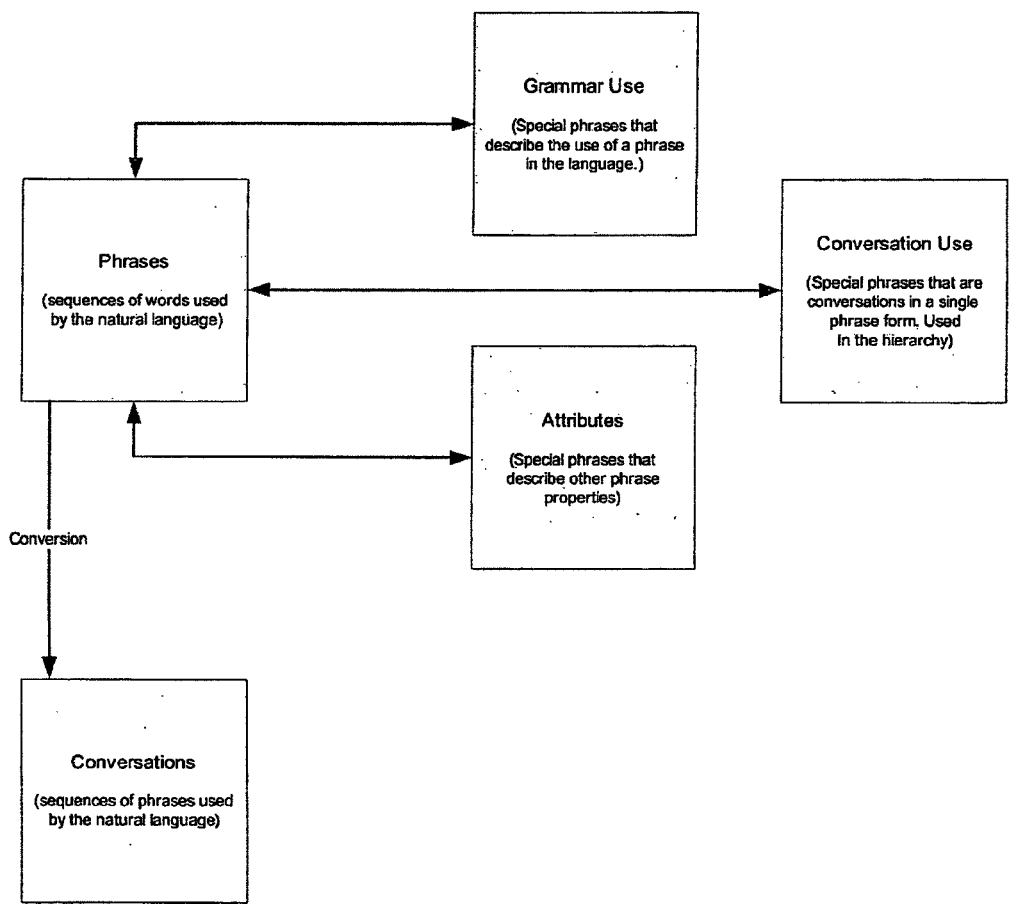
FIG. 10 shows an extension of the model at a higher level.

While the invention as described covers the operation of a grammar parsing procedure, the principles involved in parsing words into their constituent grammar operate equally effectively at higher and lower levels. FIG. 10 shows the extension of the model using the output of FIG. 4 which can be repeated further both higher and lower as the implementation is hierarchical. The methods needed to identify the sequences of letters in a word and the relationships between clauses can be implemented using the invention described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

What is claimed is:

1. A method of operating a computer to perform linguistic analysis, comprising the steps of:
   splitting an input text into words and sentences;
   for each sentence, comparing phrases in each sentence with known phrases stored in a database, as follows:
      for each word in the sentence, comparing a value thereof and values of the words following it with values of words of stored phrases;
      in the event a match is found between the value of at least two consecutive words and the value of words of a stored phrase, labelling the matched at least two consecutive words with an overphrase that describes the matched value;
      after a penultimate word has been compared, recasting the sentence by replacing the matched phrases by respective overphrases; and
      then repeating the step of comparing phrases with the recast sentence until there is no further recasting by the step of using the overphrase in the comparison as a word until there is no further match found.

2. A method according to claim 1, wherein the value used in the step of comparing phrases corresponds to a literal meaning of the words.

3. A method according to claim 1, wherein the value used in the step of comparing phrases corresponds to a grammatical use of the words.

4. A method according to claim 1, wherein the value used in the step of comparing phrases corresponds to an attribute of the words.

5. A method according to claim 1,
   wherein in a first comparison in the step of comparing a value, the value corresponds to one of:
      a literal meaning,
      a grammatical use and
      an attribute, and
   wherein in a second comparison in the step of comparing a value, the value is either of the two remaining values.

6. A method according to claim 5, wherein in a third comparison in the step of comparing a value, the value is the remaining value.

7. A method according to claim 1, wherein the step of comparing phrases comprises more than the comparison of the values of words.

8. A method according to claim 7, wherein the step of comparing phrases includes a conditional requirement dependent on words around the phrase.

9. A method according to claim 1, wherein the step of comparing phrases is performed according to a predetermined order.

10. A method according to claim 1, wherein phrases and words in the input text are converted to their overphrases according to a predetermined conversion order associated with the phrases and words.

11. A method according to claim 1, wherein the step of comparing further comprises an error correction step that corrects a misspelled word in the input sentence when a spelling error is encountered and repeats the step of comparing phrases with the corrected word.

12. A method according to claim 1, further comprising a setup step where words and their relationship with literal phrases, grammatical phrases and other attributes are stored in a database.

13. A method according to claim 1, further comprising the step of learning new words during operation.

14. A method according to claim 1, wherein word sense disambiguation is addressed by loading all word senses for each word and deselecting those senses that are not valid in the text provided.

15. A method according to claim 1, wherein word sense disambiguation is addressed by determining a consistent alternative for a word or phrase using grammar uses and attributes of the word or phrase.

16. A method according to claim 15, wherein equivalent phrases and words are in a different language.

17. A method according to claim 15, wherein to generate a text from grammar uses and attributes of words and phrases, the method further comprises the steps of:
   for each overphrase in the input text, starting from a last overphrase determined, performing language generation to find an equivalent for the phrase or words represented by the overphrase, as follows:
      obtaining all equivalent phrases of the overphrase from the database; and
      if equivalent phrases are found in a targeted language, determining a word or phrase with equivalent attributes for the overphrase;
      after the last overphrase has been considered, recasting the sentence by replacing the overphrases by respective equivalents, which may be overphrases at a lower level; and
      then repeating the generation process until all overphrases are matched to words or their equivalents in the targeted language.

18. A method according to claim 1, implemented using an object-oriented (OO) programming language such that relationships between a word and related grammar use words which are words describing grammatical and semantic usage of the word; phrases; word senses; and attributes are encapsulated within a word object.

19. A method according to claim 1, implemented in computer-based devices selected from the group consisting of servers, personal computers, laptops, mobile phones and personal digital assistants (PDAs).

20. A computer system which implements the method according to claim 1.

21. Software for programming a computer to perform the method according to claim 1.

22. A method according to claim 1, wherein said step of comparing each word in the sentence and values of the words following it with values of words of stored phrases, performs this step, starting with a longest stored phrase that starts with that word, and working from longest to shortest.

* * * * *